US005607765A

United States Patent [19]
Hansen et al.

[11] Patent Number: 5,607,765
[45] Date of Patent: Mar. 4, 1997

[54] SULFONATE-CONTAINING POLYESTERS DYEABLE WITH BASIC DYES

[75] Inventors: Steven M. Hansen, Wilmington; James M. Howell, Greenville; Cecil E. Reese, Kinston, all of N.C.

[73] Assignee: E. I. Du Pont de Nemours and Comany, Wilmington, Del.

[21] Appl. No.: 695,269

[22] Filed: Aug. 9, 1996

Related U.S. Application Data

[63] Continuation-in-part of Ser. No. 443,744, May 18, 1995, Pat. No. 5,559,205.

[51] Int. Cl.$^6$ ........................................ D02G 3/00
[52] U.S. Cl. ........................ 428/364; 528/275; 528/295; 528/302; 528/308; 428/364; 428/369; 428/401; 524/777
[58] Field of Search ...................... 528/275, 295, 528/302, 308; 428/364, 369, 401; 524/777

[56] References Cited

U.S. PATENT DOCUMENTS

| | | |
|---|---|---|
| 2,071,251 | 2/1937 | Carothers . |
| 2,465,319 | 3/1949 | Whinfield et al. . |
| 3,018,272 | 1/1962 | Griffling et al. . |
| 3,706,712 | 12/1972 | Davis et al. . |
| 3,712,919 | 1/1973 | Juelke . |
| 3,771,307 | 11/1973 | Petrille . |
| 3,772,872 | 11/1973 | Piazza et al. . |
| 3,816,520 | 11/1974 | Juelke et al. . |
| 4,042,618 | 8/1977 | Davis et al. . |
| 4,110,316 | 8/1978 | Edging et al. ............................ 426/68 |
| 4,113,704 | 9/1978 | MacLean et al. ........................ 528/289 |
| 4,134,882 | 1/1979 | Frankfort et al. . |
| 4,146,729 | 3/1979 | Goodley et al. .......................... 560/94 |
| 4,156,071 | 5/1979 | Knox . |
| 4,195,051 | 3/1980 | Frankfort et al. . |
| 4,945,151 | 7/1990 | Goodley et al. ......................... 528/272 |
| 5,053,482 | 10/1991 | Tietz ........................................ 528/272 |
| 5,171,309 | 12/1992 | Gallagher et al. ...................... 604/365 |
| 5,250,245 | 10/1993 | Collins et al. . |
| 5,288,533 | 2/1994 | Collins et al. . |

*Primary Examiner*—Samuel A. Acquah

[57] ABSTRACT

Filaments of ethylene terephthalate polyester copolymers that contain a lithium salt of a glycollate of 5-sulfo-isophthalic acid provide improvements over commercially-available basic-dyeable polyester filaments.

9 Claims, 1 Drawing Sheet

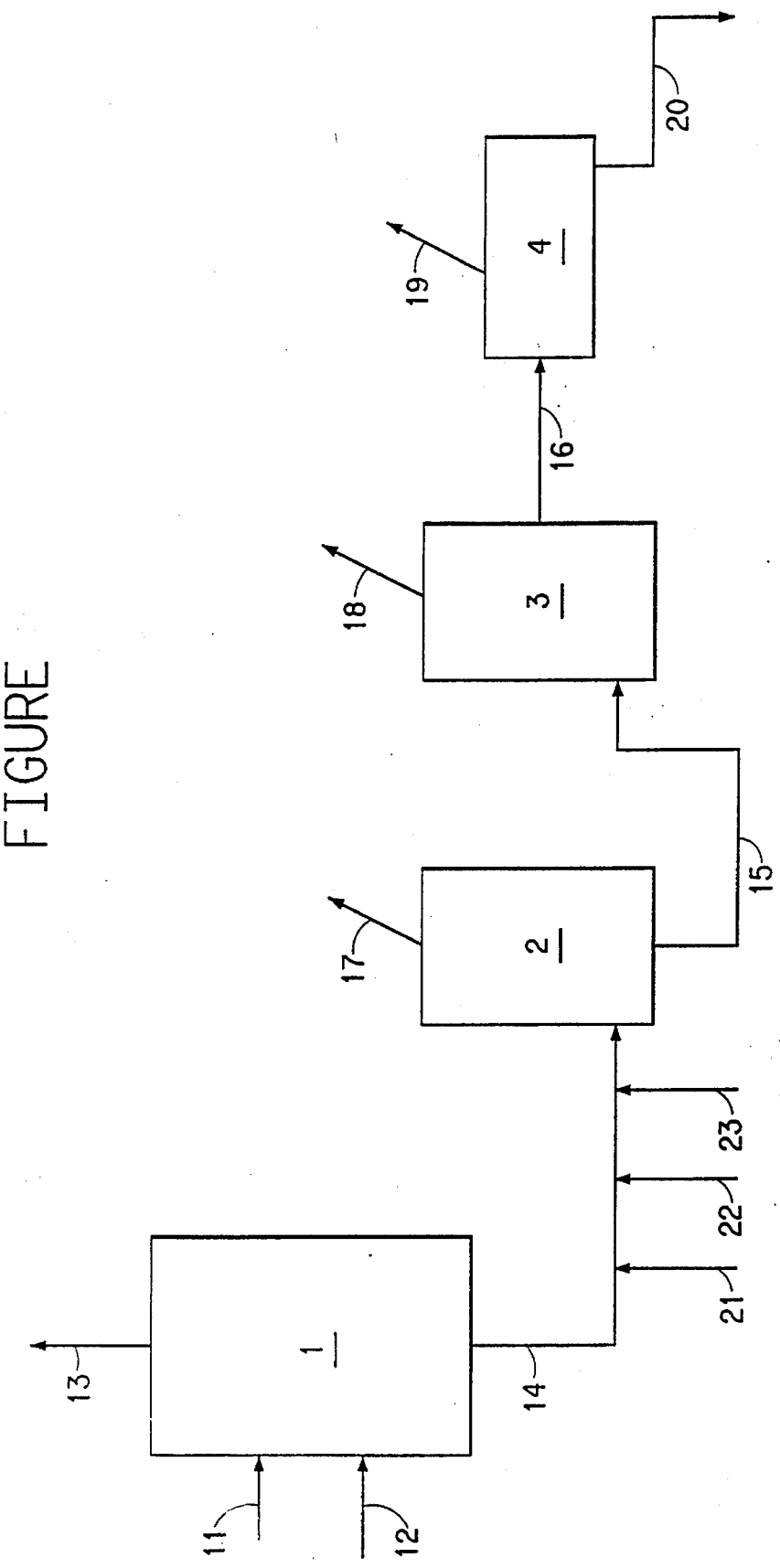
FIGURE

SULFONATE-CONTAINING POLYESTERS DYEABLE WITH BASIC DYES

CROSS-REFERENCE TO RELATED APPLICATION

This application is a continuation-in-part of our application Ser. No. 08/443,744 (DP-6335), filed May 18, 1995, now allowed and to issue as U.S. Pat. No. 5,559,205, sometimes referred to herein as our parent patent.

FIELD OF THE INVENTION

This invention concerns improvements in and relating to sulfonate-containing polyesters that are dyeable with basic dyes and more particularly to new filaments of such polyesters.

BACKGROUND OF INVENTION

Polyesters have been produced commercially on a large scale for processing into shaped articles such as fibers, films and bottles, primarily from poly(ethylene terephthalate). Synthetic polyester yarns, for example, have been known and used commercially for several decades, having been first suggested by W. H. Carothers, U.S. Pat. No. 2,071,251, and then Whinfield and Dickson suggested poly(ethylene terephthalate) in U.S. Pat. No. 2,465,319. This polyester polymer has been used most frequently for commercial purposes and has been made from ethylene glycol and from dimethyl terephthalate or terephthalic acid; these polymer precursors have been conveniently reacted together commercially by ester interchange or by direct esterification, respectively, followed by condensation polymerization, generally in multiple stages, with appropriate provision to remove condensation products, such as water, and also excess ethylene glycol that is preferably recycled with removal of unwanted water and by-products, as appropriate, as described in the art, e.g., Edging and Lee, U.S. Pat. No. 4,110,316, MacLean and Estes, U.S. Pat. No. 4,113,704, Goodley and Shiftier, U.S. Pat. No. 4,146,729, and Goodley and Taylor, U.S. Pat. No. 4,945,151.

As indicated, although many polyester polymers (including copolymers) have been suggested, the polyester most widely manufactured and used hitherto for textile fibers has been poly(ethylene terephthalate), which is often referred to as homopolymer. Homopolymer has generally been preferred over copolymers because of its lower cost, and also because its properties have been entirely adequate, or even preferred, for most end-uses. It is known, however, that homopolymer requires special dyeing conditions (high temperature requiring super-atmospheric pressure) not required for nylon fibers, for example. Homopolymer is often referred to as 2G-T.

Poly(ethylene terephthalate/5-sodium-sulfoisophthalate) copolyester has, however, also been manufactured and used commercially in considerable quantities for some thirty years, especially for staple. This copolyester was first suggested by Griffing and Remington in U.S. Pat. No. 3,018,272. A very desirable feature of this copolyester is its affinity for basic (cationic) dyes. Commercially, such copolyester has contained about 2 mole % of the ethylene 5-sodium-sulfo-isophthalate repeat units. Such basic-dyeable copolyester has sometimes been referred to as 2G-T/SSI. This basic-dyeable SSI-containing copolyester has been regarded as important. It has long been highly desirable to make improvements in providing basic-dyeable copolyesters, especially for spinning into filaments for use as textile fibers.

As mentioned in our parent U.S. Pat. No. 5,559,205, for making basic dyeable 2G-T/SSI copolyester, we had followed essentially what was taught by Griffing and Remington; we had modified our continuous process of making homopolymer (2G-T) starting from DMT, in that we had added the sodium salt of the dimethylester of 5-sulfoisophthalic acid (5SI) separately into the first vessel 1, in which the ester interchange takes place, manganese acetate (ester interchange catalyst) and antimony trioxide (polymerization catalyst) being fed in as part of the stream of catalyzed glycol (2G), although the antimony trioxide can be added later, and phosphoric acid being added in line 14 to tie up the ester interchange catalyst.

Our parent U.S. Pat. No. 5,559,205 (DP-6335) provides a novel process for preparing sulfonate-modified (basic-dyeable) polyesters of the type originally invented by Griffing and Remington with surprising advantages, especially in avoiding the prior art's reliance on adding an antimony catalyst in the condensation polymerization, and leading to new compositions of matter with improvements in processing and products, including various novel filaments of preferred lithium salt basic-dyeable copolyesters that show advantages over the SSI-containing copolyester filaments that have been available commercially. Thus, we found that lithium 5-sulfo-isophthalic acid glycollate (often referred to herein as LISIPG), which can be written as bis(2-hydroxyethyl)lithium 5-sulfoisophthalate, acts as a polymerization catalyst itself in the preparation of such sulfonate-modified copolyesters, especially if added into homopolymer glycollate (HPG, bis(2-hydroxyethyl)terephthalate) well-mixed with titanium dioxide. This reduces and may even avoid a need for using an antimony polymerization catalyst. Similarly, we found that NASIPG (the corresponding sodium salt glycollate) could be used as a catalyst for making the corresponding sodium salt-containing basic-dyeable copolyesters and textile fibers. Such metal salts may sometimes be referred to herein as a "metal sulfonate salt of a glycollate of isophthalic acid", but are more correctly referred to as a "metal salt of a glycollate of 5-sulfo-isophthalic acid", which latter terminology is used in the claims. As indicated, we have found that the lithium salt-containing basic-dyeable copolyesters have given advantages when used as textile fibers.

SUMMARY OF THE INVENTION

According to one aspect of the present invention, therefore, there are provided oriented filaments of basic-dyeable ethylene terephthalate copolyester that contains 0.5 to 5 mole percent of lithium salt of a glycollate of 5-sulfoisophthalic acid and of fine titre not more than about 2 dtex per filament.

According to another aspect, there are provided oriented filaments of basic-dyeable ethylene terephthalate copolyester that contains 0.5 to 5 mole percent of lithium salt of a glycollate of 5-sulfo-isophthalic acid, and being spun-oriented filaments; more particularly such oriented filaments that are crystalline and in the form of a yarn whose boil-off shrinkage (BOS) and dry-heat shrinkage measured at 160° C. (DHS) are not more than about 15%, and whose DHS is not more than about 2% greater than the BOS; and such oriented filaments that are partially oriented; e.g., in the form of a draw-texturing feed yarn; or of a warp-draw feed yarn.

According to further aspect, there are provided oriented filaments of basic-dyeable ethylene terephthalate copolyester that contains 0.5 to 5 mole percent of lithium salt of a glycollate of 5-sulfo-isophthalic acid, in the form of a yarn of tenacity about 2 to about 5 g/denier and of elongation-to-break ($E_B$) about 15 to about 50%.

According to a still further aspect, there are provided oriented filaments of basic-dyeable ethylene terephthalate copolyester that contains 0.5 to 5 mole percent of lithium salt of a glycollate of 5-sulfo-isophthalic acid, in the form of a tow without interlace and of tenacity about 2 to about 5 g/denier and of elongation-to-break ($E_B$) about 15 to about 50%; and, likewise, in the form of staple fiber of tenacity about 2 to about 5 g/denier and of elongation-to-break ($E_B$) about 15 to about 50%, and of cut length about 1 to about 20 cm.

The terms "filament" and "fiber" are not used herein in any mutually-exclusive sense, but generically, and the term "continuous filament" will be used if such is intended, and "staple fiber" or "cut fiber" will be used if continuous filaments are intended to be excluded.

BRIEF DESCRIPTION OF DRAWINGS

The FIG. 1 is a schematic representation of a 4-vessel continuous polymerization process that is used in the Examples as described therein and more particularly in our parent U.S. Pat. No. 5,559,205 (DP-6335).

DETAILED DESCRIPTION OF INVENTION

For a more complete understanding of details of the process and improvements we have achieved, reference may be made to our parent U.S. Pat. No. 5,559,205 (DP-6335) and to the voluminous published art for information about processes for preparing polyester polymers primarily based on poly(ethylene terephthalate), including those used for preparing sulfonate-containing polymers. 5-Sulfoisophthalic acid (5SI) has been the preferred. sulfoisophthalic acid and has previously been incorporated into commercial basic-dyeable polyester as its sodium salt. The lithium salt is, however, used according to the present invention, and is used in amount 0.5 to 5 mole %, calculated as a glycollate, with respect to the ethylene terephthalate copolyester copolymer. The precise amount will often depend on whether it is desirable for the eventual shaped articles to have better affinity for basic dyes (i.e., to dye more deeply), in which case more of the metal sulfonate should generally be incorporated, or to have more strength, in which case lower amounts of the metal sulfonate may generally be incorporated. The precise amounts of the metal sulfonate salt are generally between about 1 and about 2.5 mole percent in the final polymer, generally being a good balance between good dyeability and tenacity (of fibers and yarns). The amount required of the lithium salt is generally less than of the sodium salt to get equivalent dye affinity. So far as we are aware, the only basic-dyeable copolyester copolymer that has previously been available commercially has been the aforementioned ethylene terephthalate copolymer containing a small content of the sodium salt of 5-sulfoisophthalic acid (5SI); the amount of the 5SI may have varied somewhat, for instance down to about 1.4 mole %.

The present invention is based on advantages that we have found in the use of lithium as the metal salt over the sodium salt that has always been used previously in commercial practice. These advantages seem to derive from the ability to achieve polymer of higher molecular weight at operable melt viscosity, which provides filaments of higher tenacity and/or elongation, resulting in lower numbers of broken filaments during processing, thus permitting, for example, higher texturing temperatures to obtain higher bulk levels and/or higher texturing speeds and/or higher texturing tensions, fewer texturing breaks and an ability to texture lower deniers of filaments and/or yarns, and permitting applications requiring such higher tenacities and/or elongations. Some of these advantages will be apparent in the following Examples, and it will be noted that novel filaments, yarns, and tows are obtainable by use of the lithium salts, and having advantages over products of the sodium salts such as have been commercially manufactured in the art. Thus, lithium salt polymers of LRV in the range 15–21 are preferred, especially 16–20 LRV.

The following Examples further illustrate the invention. It will be noted that the amounts of sulfonate salt modifier incorporated in the final polymer are generally calculated with respect to mole contents of the residues of the diacid components, and are usually listed as "Copol, mole %". In contrast, DEG content is calculated as weight % of the polymer (DEG being diethylene glycol and being a by-product that is not generally desirable). Most of the fiber properties are conventional tensile and shrinkage properties, measured conventionally, as described in the art cited. "BOS" is for boil-off shrinkage. "DHS" is for dry heat shrinkage, measured at 160° C. "DT, g" indicates the draw tension, in grams, and was measured at a draw ratio of 1.7X, unless otherwise indicated, and at a speed of 185 ypm (about 170 meters per min.), and 185° C. for texturing feed yarns, and was measured at a draw ratio of 1.4X and a speed of 150 ypm (about 140 meters per min.), at the same temperature of 185° C. Leesona Shrinkage is a standard test for measuring bulk in a textured yarn; a higher Leesona Shrinkage indicates a bulkier yarn. The textured yarns were made from partially-oriented draw-texturing feed yarns using a Barmag FK-900 draw-texturing machine (L configuration) fitted with polyurethane texturing discs, a 1.6X draw ratio, a disc-to-yarn ratio of 1.599, a first heater temperature of 205° C. (only the first heater was activated), a draw-texturing speed of 500 m/min, and wound up with 3.29% overfeed take-up.

Relative viscosity is often referred to herein as "LRV", and is the ratio of the viscosity of a solution of 80 mg of polymer in 10 ml of a solvent to the viscosity of the solvent itself, the solvent used herein for measuring LRV being hexafluoroisopropanol containing 100 ppm of sulfuric acid, and the measurements being made at 25° C., as described in Broaddus U.S. Pat. No. 5,104,725 and in Duncan U.S. SIR H1275.

Although we believe that continuous polymerization has advantages over batch operations, and so the Examples are mainly directed to continuous processes, batch processing may still be used, as will be seen. As will be understood, the precise operating conditions may be varied, as described in the art. For instance, some processes may prefer to use a 3-vessel process, by using only 2 polymerizing steps. Also as will be seen, and unlike our parent (DP-6335) referred to above, the present invention is not limited to polymers containing little or no antimony (Sb) but, if desired, conventional catalysts may be used, it being recognized that this may be undesirable and may even be banned in some jurisdictions, eventually.

EXAMPLE 1

Polymer was prepared, using a prior art 4-vessel continuous polymerization system (as illustrated in FIG. 1) coupled to a melt-spinning machine. In such a process, an ester interchange reaction has been carried out in a first vessel 1 between molten dimethyl terephthalate (DMT) fed in at 12 and ethylene glycol (2G) fed in at 11 in the form of a catalyzed glycol stream. Low molecular weight material referred to herein as "HPG" (for homopolymer glycollate), i.e., glycollate of terephthalic acid, is removed through line 14 and passed to a second vessel 2, where polymerization is carried out to form low molecular weight polymer. This low molecular weight polymer is pumped through line 15 to a third vessel 3, where polymerization is continued, and the resulting polymer is passed through line 16 to a fourth vessel 4, which is often referred to as a finisher, where polymer of the desired viscosity is prepared for spinning.

According the present Example, however, polymer was prepared from dimethyl terephthalate (DMT), bis(2-hydroxy ethyl) lithium 5-sulfoisophthalate (LISIPG), and, as the glycol component fed to the reaction, ethylene glycol (2G); the polymer also contained diethylene glycol (DEG) which was generated in the reaction process.

Exchange catalyst(s), antifoam and 2G were premixed to form the stream of catalyzed glycol. The exchange catalyst was manganese acetate (MnAc) mixed with lithium acetate (LiAc) in a mole ratio of 9:1 LiAc:MnAc. The lithium acetate was used to buffer the mixture to retard formation of DEG. No polymerization catalyst was added to this catalyzed glycol stream. The catalyzed glycol stream was fed via line 11 into the first vessel 1 where the ester interchange reaction was carried out. Pure DMT was metered directly into the first vessel 1 as a separate stream at line 12. The catalyzed glycol stream was adjusted to give approximately 100 ppm Mn in the final polymer. The mole ratio of 2G to DMT was approximately 2:1. The temperature of the first vessel 1 ranged from approximately 65° C. at the top of the column to approximately 240° C. at the bottom. Methanol was removed at the top through line 13 (via a reflux condenser, not shown). The vessel was operated at atmospheric pressure with a residence time of approximately 60 minutes. Molten HPG (low molecular weight glycollalte of terephthalic acid) was removed through line 14 and passed to the second vessel 2.

Various ingredients were injected into the HPG as it passed along line 14. The order of injection of the ingredients along line 14 proved to be very important. $TiO_2$ should be added before LISIPG to prevent agglomeration of $TiO_2$ and/or sulfonate. Phosphoric acid can be added as the first or last additive. In this first polymer for this Example, the following ingredients were added. Sufficient phosphoric acid was added to the molten HPG first at injection point 21 to give approximately 100 ppm P in the final polymer. In addition, a slurry of $TiO_2$ in 2G was added at injection point 22 and its injection rate was adjusted to give approximately 0.3 wt % $TiO_2$ in the polymer. Following these injections, a solution of approximately 20% by weight of bis(2-hydroxy ethyl) lithium 5-sulfoisophthalate (LISIPG) in 2G with lithium acetate (as buffer) was added at injection point 23. The LISIPG stream injection rate was adjusted to give 1.4 mole % of LISIPG in polymer. The total lithium acetate from the catalyzed glycol and from the LISIPG stream was approximately 125 ppm Li based on the polymer. As will be indicated hereinafter, the amounts added can also have an important effect on the course of polymerization and the resulting polymer.

The mixture was then introduced into the second vessel 2 where the temperature was increased to about 245° C. and the pressure was reduced to about 120 mm Hg with a residence time of about 30 minutes. Excess 2G was removed through a vacuum system at 17 and polymerization was initiated to form low molecular weight polymer material, which was then pumped through line 15 to the third vessel 3 where the temperature was increased to about 272° C. and the pressure was reduced to approximately 45 mm Hg, as more 2G was removed through a vacuum system 18 over a period of about 10 minutes.

The resulting prepolymer was then transferred through line 16 to the fourth vessel 4 where the temperature was controlled at approximately 280° C. and the pressure was reduced to about 8 mm Hg, being controlled automatically to maintain polymer melt viscosity as determined by an in-line viscometer. After about 200 minutes, some of the polymer was recovered and found to have a relative viscosity (LRV) of approximately 18. Upon analysis, this polymer composition was determined to be composed of acid-based units having a mole ratio of about 98.6/1.4 mole % of T/LISIP and glycol-based units of about 97.5/2.5 weight % of 2G/DEG.

1. The polymer was spun using conventional polyester fiber melt-spinning (S-wrap) technology into partially oriented filaments by extruding through orifices (of about 0.25 mm diameter) of a spinneret maintained at a temperature such as required to give a polymer temperature of approximately 295° C. The filamentary streams leaving the spinneret were quenched with air at 21° C. (17° C. wet bulb), collected into bundles of 34 filaments, approximately 0.4 wt % of a spin finish was applied, and the filaments were interlaced and collected at about 3000 meters per minute as a 34-filament yarn.

TABLE 1A1

|  | 1.4 Mole % LISIPG | 1.4 Mole % NASIPG | 2.0 Mole % Na Salt |
|---|---|---|---|
| Copol, Mole % | 1.42 | 1.48 | 2.0 |
| DEG, Wt % | 2.53 | 3.85 | 4.04 |
| LRV | 18.1 | 16.4 | 13.5 |
| Spin Speed, ymp | 3243 | 3312 | 3459 |
| (mpm) | (2965) | (3028) | (3163) |
| Denier | 247 | 243 | 247 |
| Ten, gpd | 2.0 | 1.9 | 1.7 |
| $E_B$, % | 147 | 145 | 138 |
| Mod, gpd | 23.0 | 23.3 | 24.3 |
| DHS, % | 67 | 67 | 68 |
| BOS, % | 63 | 62 | 61 |
| DT, g | 91.3 | 90.6 | 88.5 |
| DRAW-TEXTURED YARN PROPERTIES (1.6X Draw Ratio) | | | |
| Ten, gpd | 3.7 | 3.2 | 2.8 |
| $E_B$, % | 39 | 38 | 34 |
| Leesona Shrinkage, % | 41 | 37 | 37 |

Partially-oriented yarn and draw-textured yarn properties are shown in Table 1A1 (under LISIPG), and are compared with those of a commercially-available prior art yarn containing 2 mole % of the corresponding sodium salt (under Na salt), and also of yarn prepared similarly to the invention, but from polymer made with about 1.4 mole % of NASIPG, instead of the LISIPG. It will be noted that the LRV of the LISIPG polymer is higher than for either NASIPG or Na Salt because, as mentioned, the melt viscosities of the sodium salt polymers are higher and the LRV's indicated for those polymers were as high as reasonably possible consistent with a low enough melt viscosity to enable practical and operable spinning into filaments. Thus, we have provided, according to the invention, novel partially-oriented yarns of filaments of basic-dyeable copolyester containing about 0.5 to about 5 mole %, preferably about 1 to about 2.5 mole %, of lithium salt of a glycollate of 5-sulfo-isophthalic acid, having properties superior to those hitherto obtainable from commercial basic-dyeable polyester polymer, and capable of being draw-textured to textured yarns that are similarly superior to what has been available hitherto.

Thus, the yarn of the invention made with LISIPG showed significantly superior tenacity over either yarn containing the corresponding sodium salt, it being understood that the yarn made with 1.4 mole % NASIPG had significantly less ability to be dyed, whereas the commercially-available yarn having 2.0 mole % Na salt (which had the lowest tenacity) provided an ability to dye roughly equivalent to that now provided by the yarn according to the invention containing only 1.4 mole % LISIPG.

It proved possible to get more bulk (as shown by a higher Leesona Shrinkage) in the yarn of the invention made with lithium salt, than in either of the yarns made with sodium salt.

More procedures are described hereinafter, and are included in this same Example, but the above procedure, using LISIPG, is what is intended when we refer hereinafter to the procedure of Example 1.

We have also prepared polymer similarly but containing amounts of LISIPG varying from 0.5 mole % (1.54 wt % DEG and 19 LRV) to 2 mole % (17.1 LRV and 2.97 wt. % DEG) and spun POY therefrom at similar speeds (and up to 3500 ypm, 3200 mpm) to get 250–34 yarns with similar draw tensions of about 90 g and somewhat similar tensile and shrinkage properties, as will now be described.

2. Polymer was prepared and spun essentially as described above, except that they were collected at about 3200 yards per minute (as a 34-filament texturing feed yarn). Yarn properties are shown in Table 1A2 and are compared with those of an available prior art yarn containing 2 mole % of the corresponding sodium (Na) salt.

TABLE 1A2

|  | 1.4 Mole % LISIPG | 2.0 Mole % Na Salt |
| --- | --- | --- |
| Copol, Mole % | 1.40 | 1.90 |
| DEG, wt. % | 2.21 | 2.04 |
| LRV | 17.4 | 12.9 |
| Spin Speed, ypm | 3207 | 3450 |
| Denier | 115 | 115 |
| Ten, gpd | 2.1 | 1.7 |
| $E_B$, % | 146 | 134 |
| DHS, % | 65 | 66 |
| BOS, % | 64 | 56 |
| DT, g | 48 | 45 |
| DRAW-TEXTURED YARN PROPERTIES (1.6X Draw Ratio) | | |
| Ten, gpd | 3.4 | 2.8 |
| $E_B$, % | 38 | 30 |

3. Polymer was prepared containing 1.3 mole % of LISIPG, otherwise essentially as described, and was spun essentially similarly at spinning speeds from 2800 to 3200 yards/minute as a 34 filament yarn for warp-drawing. Yarn properties are shown in Table 1A3 and are compared with those of an available prior art yarn containing 2 mole % of the corresponding sodium (Na) salt.

TABLE 1A3

|  | 1.3 Mole % LISIPG | | | 2.0 Mole % Na Salt |
| --- | --- | --- | --- | --- |
| Copol, Mole % | 1.3 | 1.3 | 1.3 | 2.0 |
| DEG, wt. % | 2.07 | 2.01 | 2.11 | 3.20 |
| LRV | 17.4 | 17.5 | 16.4 | 12.9 |

TABLE 1A3-continued

|  | 1.3 Mole % LISIPG | | | 2.0 Mole % Na Salt |
| --- | --- | --- | --- | --- |
| Spin Speed, ypm | 2800 | 3000 | 3200 | 2800 |
| Denier | 116 | 116 | 115 | 116 |
| Ten, gpd | 1.9 | 2.0 | 2.1 | 1.6 |
| $E_B$, % | 167 | 153 | 144 | 172 |
| DHS, % | 73 | 69 | 66 | 74 |
| DT, g | 30 | 40 | 46 | 23 |

4. Polymer was prepared and spun essentially similarly except that it was spun into a 68 filament partially oriented yarn for texturing. Yarn properties are shown in Table 1A4 and are compared with those of a corresponding yarn made with the sodium (Na) salt.

TABLE 1A4

|  | LISIPG | Na Salt |
| --- | --- | --- |
| Copol, Mole % | 1.33 | 1.5 |
| DEG, wt. % | 2.2 | 3.51 |
| LRV | 17.5 | 16.2 |
| Spin Speed, ypm | 3157 | 3157 |
| Denier | 100 | 101 |
| Ten, gpd | 2.1 | 1.9 |
| $E_B$, % | 138 | 129 |
| DHS, % | 60 | 60 |
| DT, g | 55 | 58 |
| DRAW-TEXTURED YARN PROPERTIES (1.6X Draw Ratio) | | |
| Ten, gpd | 3.2 | |
| $E_B$, % | 21 | |

5. Polymer was prepared essentially similarly except that the injection rates of the LISIPG were varied to effect different levels in the final polymer, and these polymers were spun into 34 filament partially oriented yarns for texturing. The yarn properties are shown in Table 1A5 and are compared with those of a prior art yarn made with the sodium (Na) salt.

TABLE 1A5

|  | 1.4 Mole % LISIPG | | | | 2.0 Mole % Na Salt |
| --- | --- | --- | --- | --- | --- |
| Copol, Mole % | 0.5 | 1.05 | 1.47 | 2.02 | 2.0 |
| DEG, wt. % | 1.54 | 1.90 | 2.66 | 2.97 | 2.04 |
| LRV | 19.0 | 17.4 | 17.5 | 17.1 | 12.8 |
| Spin Speed, ypm | 3498 | 3320 | 3269 | 3288 | 3509 |
| Denier | 245 | 246 | 246 | 246 | 247 |
| Ten, gpd | 2.3 | 2.1 | 1.9 | 1.8 | 1.7 |
| $E_B$, % | 134 | 145 | 139 | 132 | 132 |
| DHS, % | 68 | 63 | 66 | 68 | 67 |
| DT, g | 91 | 91 | 91 | 92 | 89 |

Very fine polyester filaments of titre not more than about 2 dtex have not hitherto been commercially acceptable from basic-dyeable ethylene terephthalate copolyester (2-GT/SSI containing about 2 mole % of the 5SI units) because they have not had adequate strength to satisfy commercial needs. As will be seen, however, use of lithium salt according to the present invention provides for the first time commercially-acceptable fine filaments of basic-dyeable copolyester.

Some polymer made by essentially the same procedure (but of 17.7 LRV, and with 1.45 mole % of LISIPG and 2.4 wt % DEG) was spun into a 200 filament low dpf partially oriented yarn, and then drawn to subdenier filaments, using a spinneret heated to such temperature as required to obtain a polymer temperature of 293° C. and extrusion orifices of approximately 0.23 mm in diameter. Yarn properties are shown in Table 1B, showing its tenacity is higher than that of a yarn made with 1.4 mole % the NASIPG, also shown in Table 1B. When attempts have been made to spin such low dpf yarns using commercially-available polymer containing 2 mole % of the sodium salt made by standard polyester polymer technology, the filament bundle has been too weak to allow continuous spinning of a threadline from such polymer. The polymer and yarn made using 1.4 mole % NASIPG perform better in some respect than the polymer containing 2 mole % of the sodium salt that has been available commercially, but their dyeability is inferior, in contrast to the dyeability of the yarn containing 1.4 mole % LISIPG.

TABLE 1B

|  | LISIPG | NASIPG |
|---|---|---|
| Copol, Mole % | 1.45 | 1.40 |
| DEG, Wt % | 2.42 | 2.42 |
| LRV | 17.7 | 15.7 |
| Spin Speed, ypm | 2501 | 2501 |
| (mpm) | (2287) | (2287) |
| Denier | 211 | 211 |
| Ten, gpd | 2.1 | 1.8 |
| $E_B$, % | 136 | 142 |
| Mod, gpd | 25.3 | 25.6 |
| DHS, % | 54 | 58 |
| BOS % | 50 | 58 |
| DT, g | 138.0 | 117.3 |
| DRAWN YARN PROPERTIES (1.6X Draw Ratio) | | |
| Denier | 133 | 133 |
| Ten, gpd | 3.3 | 2.8 |
| $E_B$, % | 45 | 39 |
| BOS, % | 24 | 25 |

Essentially the same procedure as for Table 1B was used, except that the 200 subdenier filaments were spun directly, total as-spun yarn denier being approximately 150 denier. Yarn properties are shown in Table 1C, and those made with 1.4 mole % LISIPG are compared with those made with 1.4 mole % NASIPG, and again show superior tenacity (in addition to superior dyeability) compared to fibers made using NASIPG. As indicated, attempts to spin such yarns from commercially-available polymer made with 2 mole % of the sodium salt using standard polyester technology have not been successful, because the filament bundle has been too weak to allow continuous spinning of a threadline from such polymer.

TABLE 1C

|  | LISIPG | NASIPG |
|---|---|---|
| Copol, Mole % | 1.45 | 1.41 |
| DEG, Wt % | 2.42 | 3.00 |
| LRV | 18.2 | 15.9 |
| Spin Speed, ypm | 2501 | 2501 |
| (mpm) | (2287) | (2287) |
| Denier | 151 | 152 |
| Ten, gpd | 2.2 | 1.9 |
| $E_B$, % | 127 | 123 |
| Mod, gpd | 27.3 | 27.5 |
| DHS, % | 39 | 51 |
| BOS, % | 38 | 49 |
| DT, g | 128.5 | 107.0 |
| DRAWN YARN PROPERTIES (1.6X Draw Ratio) | | |
| Denier | 96 | 95 |
| Ten, gpd | 3.4 | 3.1 |
| $E_B$, % | 30 | 35 |
| BOS, % | 19 | 17 |

Semidull polymer prepared essentially as described at an LRV of 17.5 with 2.2 wt. % DEG and 1.33% LISIPG was spun and quenched essentially similarly to produce a yarn bundle containing 68 filaments. After quenching the yarn bundle with cross flow air at 21° C., 0.45 wt. % spin finish was applied. After passing over a feed wheel at a spin speed of 2888 mpm, the bundle was interlaced and wound onto a tube at 2867 mpm to produce a feed yarn of 100 denier and 68 filaments. Properties of feed yarns prepared in this manner (tenacity of 2.1 gpd at 138% $E_B$ and 60% DHS) were superior to those of commercially-available fiber containing 2 mole % NaSalt. These feed yarns were drawn to 59 denier at a 1.7X draw ratio without any broken filaments, and produced drawn yarns of 3.8 gpd tenacity at 22% $E_B$ and 10% DHS.

Similar polymer (except 18.8 LRV, and containing 1.4 mole % of LISIPG and 3.3 weight % of DEG) was spun into a partially oriented yarn of 200 filaments, using a similar spin process, except that a spin speed of 2022 meters per minute and a winding speed of 2016 meters per minute were employed to produce a feed yarn of 151 denier with 2.0 gpd tenacity, $E_B$ of 144% and DHS of 62%. Similar polymer was also spun into a 200 filament partially oriented feed yarn, employing a feed wheel spin speed of 2000 meters per minute and a winding speed of 1996 meters per minute, to give a feed yarn of 210 denier with 1.9 gpd tenacity, 158% $E_B$, and 70% DHS.

Similar polymers except with varying levels of LISIPG as shown in Table 1D were spun into partially oriented yarns. In these experiments, the polymer was extruded at 296° C. polymer temperature, quenched with a radial flow of air at 22° C. and wetted with a spin finish at 0.60% o.w.f., using process conditions as listed in Table 1D to give partially oriented feed yarns of 200 filaments and about 212 total denier that were suitable for textile processing and to be drawn to microdenier yarns for textile applications.

TABLE 1D

|  | A | B | C | D |
|---|---|---|---|---|
| Copol, Mole % | 0.5 | 1.0 | 1.40 | 2.0 |
| DEG, Wt % | 1.5 | 2.0 | 2.1 | 2.9 |
| LRV | 19.0 | 18.5 | 18.5 | 17.0 |
| Spin Speed (mpm) | 2569 | 2569 | 2569 | 2569 |
| Winding Speed (mpm) | 2537 | 2537 | 2537 | 2537 |
| Denier | 209 | 210 | 212 | 212 |
| Ten, gpd | 2.3 | 2.1 | 2.1 | 1.9 |
| $E_B$, % | 147 | 141 | 139 | 136 |
| Mod, gpd | 24 | 24 | 25 | 26 |
| DHS, % | 68 | 65 | 62 | 68 |
| BOS, % | 61 | 56 | 58 | 63 |
| DRAWN YARN PROPERTIES (1.7X Draw Ratio) | | | | |
| Denier | 124 | 124 | 125 | 125 |
| Ten, gpd | 3.9 | 3.9 | 3.7 | 3.2 |
| $E_B$, % | 40 | 34 | 33 | 32 |
| DHS, % | 13 | 14 | 13 | 18 |
| BOS, % | 12 | 13 | 12 | 18 |

Similar polymer, except of 18.5 LRV, and containing 1.40 mole % LISIPG, 0.3% $TiO_2$, and 2.0% DEG, was spun into microdenier partially oriented feed yarns suitable for textile processing, using the same S-wrap spinning process, polymer was extruded at 290° C. and was subjected to the process settings given in Table 1E to produce 200 filament wound yarns with varying degrees of molecular orientations as illustrated by % $E_B$ and draw tension (DT) at 1.6X draw ratio.

TABLE 1E

|  | A | B | C |
|---|---|---|---|
| Spin Speed (mpm) | 2542 | 2633 | 2725 |
| Winding Speed (mpm) | 2507 | 2594 | 2665 |
| Denier | 212 | 212 | 210 |
| Ten, gpd | 2.0 | 1.9 | 2.0 |
| $E_b$, % | 134 | 130 | 124 |
| MOD, gpd | 26 | 27 | 27 |
| DHS, % | 65 | 65 | 63 |
| BOS, % | 55 | 56 | 55 |
| DT, (1.6X DR), g | 88 | 93 | 100 |

Thus, novel fine filaments are provided for the first time from basic-dyeable ethylene terephthalate copolyester, namely containing about 0.5 to about 5 mole %, preferably about 1 to about 2.5 mole %, of the lithium salt of a glycollate of 5-sulfo-isophthalic acid are provided according to the invention, such fine filaments being of titre not more than 2 dpf (or not more than about 2 dtex per filament), and preferably of 1 dtex per filament or less, although up to about 1.5 dtex per filament is also novel and advantageous. We have drawn such filaments of varying LRV and LISIPG content down to about 0.5 dtex per filament.

Polymer prepared essentially as described was spun and drawn (single-stage) in a coupled process to produce a fully drawn direct use filament yarn. The polymer was extruded from the spinneret at approximately 294° C. and quenched using radial air flow at a temperature of approximately 21° C. A spin-finish was applied and the filaments were wrapped around a feed roll with a surface speed of 1000 yd/min, were passed through a steam draw jet at 225° F. (107° C.) where the yarn was drawn, and were passed onto draw rolls which were contained in a hot chest, heated to 115° C., and which were rotating with a surface speed of 2791 yds/min. A finish was applied to the yarns, and the filaments were interlaced and then wound on a tube at about 2742 yds/min. The yarn properties are shown in Table 1F.

TABLE 1F

| Copol, Mole % | 1.45% | (LISIPG) |
|---|---|---|
| DEG, wt. % | 2.5 | |
| LRV | 18.3 | |
| Feed Roll Speed, ypm | 1000 | |
| Draw Roll Speed, ypm | 2791 | |
| Windup Speed, ypm | 2742 | |
| Denier | 74 | |
| Tenacity, gpd | 3.4 | |
| $E_B$, % | 32 | |

TABLE 1F-continued

| BOS, % | 12 |
|---|---|
| DHS, % | 15 |

Somewhat similar polymer (of 18.5 LRV and containing 1.4 mole % LISIPG, 2.8 wt. % DEC, and 0.43 wt. % $TiO_2$, except for the final 60 (denier)-34 filament items which contained only 0.04 wt. % $TiO_2$) was spun and drawn essentially similarly in a coupled spin-draw process to provide a variety of fully drawn filament yarns of different filament cross-sections (XS) as indicated in Table 1G, in which "3L" indicates a trilobal cross-section, "4C" indicates a tetrachannel scalloped-oval cross-section, and "H" indicates a hollow (single void round) cross-section and the % void is given, and their properties are also given in Table 1G under "Li". For comparative purposes, correspoonding data are given for commercially-available basic-dyeable copolyester yarns whose polymer contains 2 mole % of the sodium (Na) salt (of 15 LRV and containing about 2.5 wt. % of $TiO_2$), and it will be seen that the tenacities of the lithium salt yarns were significantly better each time.

TABLE 1G

| Items | 100-34 | | 140-48 | | 70-34 | | 40-27 | | 50-34 | | 60-50 | | 60-34 | |
|---|---|---|---|---|---|---|---|---|---|---|---|---|---|---|
| Metal | Li | Na | Li | Na | Li | Na | Li | Na | Li | Na | Li | Na | Li | Na |
| XS | 3L | 3L | 3L | 3L | 3L | 3L | 3L | 3L | 4C | 4C | H | H | 3L | 3L |
| Void | | | | | | | | | | | 19% | 15% | | |
| Roll Speeds (ypm) | | | | | | | | | | | | | | |
| Feed | 878 | 824 | 1293 | 1293 | 1457 | 1344 | 1055 | 1078 | 1744 | 1653 | 1795 | 2093 | 1570 | 1570 |
| Draw | 2598 | 2598 | 3150 | 3150 | 3297 | 3297 | 2393 | 2393 | 2997 | 2997 | 2997 | 3000 | 3297 | 3297 |
| Windup | 2542 | 2524 | 3085 | 3085 | 3281 | 3241 | 2360 | 2360 | 2944 | 2939 | 2918 | 2933 | 3256 | 3250 |
| Properties | | | | | | | | | | | | | | |
| Den | 100 | 100 | 140 | 141 | 70 | 71.5 | 40 | 41 | 50 | 51 | 60 | 61 | 60 | |
| Ten, gpd | 3.4 | 2.9 | 3.3 | 2.6 | 3.4 | 2.8 | 3.2 | 2.6 | 3.7 | 2.2 | 3.5 | 2.8 | 3.5 | |
| $E_B$, % | 36 | 40 | 35 | 40 | 35 | 33 | 42 | 39 | 30 | 30 | 27 | 24 | 32 | |
| BOS, % | 6.4 | | 8.5 | | 8.9 | | 8.0 | | 6.6 | | 5.9 | | 6.0 | |

A series of yarns were spun and drawn (coupled processes) under varying conditions from the same source of polyethylene terephthalate copolymer of 18.5 LRV containing 1.4 mole % LISIPG and 2.0 wt. % DEG, being extruded at a temperature of 294° C., quenched using a radial flow of air at 22° C., a spin finish being applied, and the filaments were wrapped around a heated feed roll with a surface speed that varied from 1370 to 2012 meters per minute and surface temperature varied between 75° C. and 125° C., as indicated in Table 1H. The yarns were wrapped around a heated draw roll at 150° C., and moving with a surface speed that varied from 3658 to 4115 mpm to effect draw ratios that varied from 2.0X to 2.7X. The yarns were then passed onto a letdown roll heated to 150° C. and moving at a surface speed equivalent to that of the draw roll, and were then wound onto tubes at speeds 18 mpm slower than their respective letdown roll surface speeds. Yarn data are shown in Table 1H. Yarn tenacities were surprisingly high for cationically dyeable polyesters.

TABLE 1H

| Item | Feed Roll Speed | °C. | Draw Roll Speed | DR | DEN | TEN gpd | EB % | MOD gpd | DHS % | BOS % |
|---|---|---|---|---|---|---|---|---|---|---|
| A | 1509 | 100 | 3658 | 2.4 | 152 | 3.5 | 53 | 69 | 14 | 14 |
| B | 1372 | 125 | 3658 | 2.7 | 149 | 3.3 | 58 | 62 | 11 | 12 |
| C | 1829 | 125 | 3658 | 2.0 | 149 | 3.7 | 42 | 74 | 12 | 12 |
| D | 1646 | 100 | 3658 | 2.2 | 149 | 3.3 | 58 | 62 | 11 | 12 |
| E | 1372 | 75 | 3658 | 2.7 | 149 | 3.7 | 42 | 74 | 12 | 12 |
| F | 2012 | 100 | 4115 | 2.0 | 149 | 3.5 | 50 | 67 | 11 | 13 |

Polymer as described in Example 1 was spun and drawn to produce a fully drawn, direct use filament yarn similarly except using a coupled 2-stage-draw process in which the filaments were first wrapped around a heated feed roll moving with a surface speed of 1829 meters per minute and with a surface temperature of 125° C., and then wrapped around a heated first draw roll moving with a surface speed of 2286 or of 2743 meters per minute and with the surface heated to 150° C. to effect a first stage draw ratio of 1.25 or 1.5, respectively, and then passed to a second draw roll with a surface speed of 4115 meters per minute, and also heated to 150° C., to effect a second stage drawn ratio of 1.8 or 1.5, respectively, and were then wound onto a tube at a speed of 4400–4420 meters per minute. Yarns produced demonstrated achievable tenacities exceeding 3.3 gpd. Yarn data is shown in Table 1I.

TABLE 1I

| Item | Feed Roll Speed | 1st Draw Speed | DR | 2nd Draw Speed | DR | DEN | TEN gpd | $E_B$ % | MOD gpd | DHS % | BOS % |
|---|---|---|---|---|---|---|---|---|---|---|---|
| A | 1829 | 2286 | 1.3 | 4115 | 1.8 | 153 | 3.4 | 53 | 67 | 11 | 12 |
| B | 1829 | 2743 | 1.5 | 4115 | 1.5 | 151 | 3.4 | 49 | 69 | 13 | 14 |

Polymer was made using a process essentially as described in Example 1 except that 0.03 wt. % $TiO_2$ delustrant was added and an antimony oxide polymerization catalyst was also added at a level of ~60 ppm Sb in polymer. The polymer prepared had a relative viscosity of approximately 19 and, upon analysis, the polymer was found to be composed of 98.6/1.4 mole % T/LISIP derived from acid-units, and glycol-based units of about 98/2 wt. % 2G/DEC. This polymer was spun and drawn in a coupled single stage draw process to produce a fully drawn direct use filament yarn. Polymer was extruded from the spinneret at a temperature of approximately 282° C. and was quenched using radial air flow at a temperature of about 23° C. A finish was applied and the filaments were wrapped around a feed roll with a surface speed of 1517 yards/min and passed through a stream draw jet at 225° F. where the yarn was drawn and passed around draw rolls which were contained in a hot chest and heated to 115° C., and were rotating with a surface speed of 2791 yards/min. A finish was applied to the yarns, the filaments were interlaced and then wound on a tube at about 2747 yds/min. The yarn properties are shown in Table 1J.

TABLE 1J

| Copol, mole % | 1.4 (LISIP) |
|---|---|
| DEG, wt. % | 2 |
| LRV | 19 |
| Feed Roll Speed, ypm | 1517 |
| Draw Roll Speed, ypm | 2791 |
| Windup Speed, ypm | 2747 |
| Denier | 61 |
| Tenacity, gpd | 3.4 |
| $E_B$, % | 27 |
| BOS, % | 6.2 |
| DHS, % | 8.2 |

Some polymer made by essentially the same procedure, but with a relative viscosity of 16 LRV, about 1.3 mole % LISIPG and about 2.3 wt. % DEG, was spun using conventional polyester staple melt-spinning technology, by extruding filaments through orifices (of about 0.38 mm diameter) of a spinneret maintained at such temperature as required to give a polymer temperature of about 290° C., quenching them with air at 21° C. (17° C. wet bulb), collecting them into bundles (and applying a spin finish) at about 1500 yards (1372 meters) per minute as a single end of approximately 3200 denier containing 900 filaments without interlace. A tow was formed by combining 50 ends to give a total of 45,000 filaments and 160,000 total denier for staple drawing (some by single-stage-draw/steam-anneal and others by single-stage-draw/hot-roll-anneal) followed by crimping, drying, and cutting into staple. Drawing conditions and resulting fiber properties are shown in Table 1K.

TABLE 1K

| ITEM | DRAW RATIO | ANNEALING CONDITION | DPF | TEN | $E_B$ | CPI |
|---|---|---|---|---|---|---|
| STEAM ANNEALED | | | | | | |
| A | 2.55 | 170 psi | 1.59 | 4.26 | 24.4 | 9.6 |
| B | 2.43 | 170 psi | 1.65 | 4.03 | 42.7 | 10.2 |
| C | 2.72 | 170 psi | 1.46 | 4.48 | 31.0 | 11.2 |
| D | 2.77 | 170 psi | 1.48 | 4.70 | 24.2 | 11.1 |
| E | 2.72 | 160 psi | 1.53 | 4.58 | 28.6 | 12.1 |
| F | 2.72 | 150 psi | 1.54 | 4.17 | 21.2 | 10.8 |
| G | 2.72 | 180 psi | 1.53 | 4.07 | 26.3 | 12.3 |
| HOT ROLL ANNEALED | | | | | | |
| H | 2.72 | 170 C. | 1.45 | 4.80 | 22.1 | 9.6 |
| I | 2.72 | 160 C. | 1.47 | 4.52 | 23.0 | 9.4 |
| J | 2.72 | 180 C. | 1.44 | 4.96 | 18.3 | 8.8 |

By way of comparison, a polymer containing 2 mole % SSI was prepared by our previous process (by adding the sodium-5-sulfoisophthalate to the catalyzed glycol feed and polymerizing in a continuous process). The recovered polymer was found to have a relative viscosity of 12.8. Upon analysis, the polymer was determined to comprise acid-based units having a mole ratio of about 98.1/1.9 mole % of T/SSI and glycol-based units of about 97.6/2.4 wt. % of 2G/DEG. This polymer was spun using the same conditions as the T/LISIP filaments of the invention to give 900 filaments with a total denier of about 3200 denier at a speed of 1500 yards/min. A tow was formed by combining ends, and the 2GT/SSI filaments were drawn using the same steam-anneal and hot roll-anneal processes as the T/LISIP filaments of the invention. The properties of the 2G-T/SSI polymer are shown in Table 1L.

TABLE 1L (2G-T/SSI (Na Salt))

| Item | Draw Ratio | Anneal Condition | DPF | TEN gpd | $E_B$ % | CPI |
|---|---|---|---|---|---|---|
| Steam Anneal | | | | | | |
| P | 2.54 | 170 psi | 1.50 | 3.6 | 27 | 12.5 |
| Q | 2.78 | 170 psi | 1.35 | 4.1 | 20 | 12.0 |
| R | 2.78 | 160 psi | 1.36 | 4.3 | 19 | 14.3 |
| Roll Anneal | | | | | | |
| X | 2.78 | 160° C. | 1.37 | 4.3 | 14 | 9.8 |
| Y | 2.78 | 170° C. | 1.37 | 4.3 | 20 | 9.4 |
| Z | 2.78 | 180° C. | 1.37 | 4.3 | 15 | 10.3 |

A comparison of Tables 1K and 1L (properties of filaments produced under essentially same conditions of drawing) shows an increase in tenacity for the T/LISIP filaments. The higher molecular weight T/LISIP fibers showed a 5–18% tenacity increase compared with prior art Na salt standard 2G-T/SSI copolymer filaments. In addition to the higher tenacities, the T/LISIP filaments had a higher fiber relaxation factor, where the relaxation factor is defined as $$\text{Relaxation Factor} = \text{Machine Draw Ratio} \times \frac{\text{Drawn Denier}}{\text{Spun Denier}} - 1$$

The relaxation factors for the annealed T/LISIP filaments are higher being ~3–16% (typical of annealed 2G-T homopolymer relaxation factors) compared with only 4–6% relaxation factors for the 2G-T/SSI Na salt filaments.

As we have indicated, the tensile properties of these lithium salt polymer tows and staple are superior to those available hitherto from sodium salt polymer of comparable basic-dyeability. Thus, for the first time, we have provided, according to the invention, tows of continuous filaments without interlace and staple of cut length about 1 cm to about 20 cm, from basic-dyeable ethylene terephthalate copolyester, namely containing about 0.5 to about 5 mole %, preferably about 1 to about 2.5 mole %, of the lithium salt of a glycollate of 5-sulfo-isophthalic acid, and of tenacity about 2 to about 4.5 g/dtex and of elongation-to-break about 15 to about 50%.

EXAMPLE 2

The procedure of Example 1 was repeated, except that no $TiO_2$ was added but antimony trioxide polymerization catalyst was added at injection point 22, i.e., prior to the addition of the solution of LISIPG. The level of addition of antimony trioxide polymerization catalyst was adjusted to obtain approximately 90 ppm Sb, i.e., approximately 30–50% of the level typically required for polyester polymerization. Operating conditions and polymer characteristics are shown in Table 2A, and show that additional polymerization catalyst was required to obtain clear polymer with a useful molecular weight. This indicates that an interaction between the LISIPG and the $TiO_2$ delusterant has an effect on the polymerization rate and promotes polymerization in the absence of additional polymerization catalyst.

TABLE 2A

| Operating Conditions | VALUES |
|---|---|
| Vessel 2 - | |
| Temperature, °C. | 246 |
| Presure, mm Hg | 100 |
| Vessel 3 - | |
| Temperature, °C. | 273 |
| Presure, mm Hg | 34 |
| Vessel 4 - | |
| Temperature, °C. | 280 |
| Presure, mm Hg | 7.3 |
| Polymer Characteristics | |
| LRV | 18.3 |
| LISIPG, Mole % | 1.42 |
| DEG, wt % | 2.7 |
| $TiO_2$ | NIL |
| Sb, ppm | 90 |
| Mn, ppm | 119 |
| P, ppm | 140 |

Polymer was spun at approximately 3151 yards (2881 meters) per minute into partially oriented yarn following essentially the same procedure as in Example 1. The yarn properties are shown in Table 2B.

TABLE 2B

| | |
|---|---|
| Copol, Mole % | 1.42 |
| DEG, Wt % | 2.70 |
| LRV | 18.3 |
| Denier | 246 |
| Ten, gpd | 2.0 |
| $E_B$, % | 143 |
| Mod, gpd | 23.4 |
| DHS, % | 69 |
| BOS, % | 62 |
| DT, g | 90.3 |

Polymer was made similarly except that 0.03 wt. % $TiO_2$ delustrant was added. This polymer had a relative viscosity of approximately 19 and, upon analysis, the polymer was found to be composed of 98.6/1.4 mole % T/LISIP and glycol-based units of about 98/2 wt % 2G/DEG. The polymer was spun using polyester staple melt spinning technology by extruding filaments through orifices in a spinneret whose temperature was maintained at ~285° C., and the filaments were quenched with air at about 70° F., collected into a bundle at about 1100 yards/min as a single end of approximately 4800 denier containing 160 filaments. A tow was formed by combining 26 ends to give a total of 4160 filaments and a total denier of ~125000 for staple drawing by a two-stage draw/relax process. Drawing conditions and resulting fiber properties are shown in Table 2C and gave a high strength basic-dyeable staple fiber suitable for use in rugs or carpets.

TABLE 2C

| Item | Draw Ratio | Relaxer Temp °C. | DPF | TEN | $E_B$ |
|---|---|---|---|---|---|
| A | 2.7 | 170 | 13.4 | 2.8 | 53 |
| B | 2.9 | 170 | 12.8 | 3.0 | 54 |
| C | 3.0 | 170 | 12.8 | 3.0 | 42 |

Polymer was made and spun and drawn by a process that was essentially similar except that 2 wt % of polyethylene oxide with an average molecular weight of 600 was added to the monomer line. This polymer had a relative viscosity of approximately 20 and, upon analysis, the polymer was found to be composed of 98.6/1.4 mole % T/LISIP and glycol based units of about 95.7/1.8/2.5 wt % 2G/DEG/PEO. Drawing and relaxing conditions and resulting fiber properties are shown in Table 2D. The resulting copolyester fibers were of high strength and easy to dye, being basic-dyeable terpolymer fibers suitable for use in rugs or carpets.

TABLE 2D

| Item | Draw Ratio | Relaxer Temp °C. | DPF | TEN | $E_B$ |
|---|---|---|---|---|---|
| A | 2.7 | 160 | 13.6 | 2.2 | 65 |
| B | 2.9 | 160 | 13.0 | 2.5 | 64 |
| C | 3.1 | 160 | 12.9 | 2.6 | 56 |

EXAMPLE 3

The procedure of Example 1 was repeated, except that the injection rate of LISIPG was adjusted to give a lower level of LISIPG in the polymer, namely about 1.0 mole %. A finisher (vessel 4) pressure of approximately 6 mm Hg was used to obtain a polymer with a relative viscosity of about 17.6 LRV. The polymer prepared by this process was analyzed and found to contain 1.06 mole % LISIPG. It proved possible to increase polymer viscosity significantly, as shown in Table 3, by decreasing finisher (absolute) pressure.

TABLE 3

| FINISHER PRESSURE (MM Hg) | VISCOSITY LRV | MOLE % LISIPG (BY ANALYSIS) |
|---|---|---|
| 6.5 | 16.5 | 1.06 |
| 6.0 | 17.6 | 1.06 |
| 5.5 | 18.6 | 1.00 |
| 5.4 | 18.8 | 1.01 |
| 4.5 | 20.2 | 0.98 |

EXAMPLE 4

The procedure of Example 1 was repeated, except that the injection rate of LISIPG was adjusted to give 0.5 mole % of LISIPG in polymer, and a finisher pressure of approximately 4.5 mm Hg was used to obtain a polymer with a relative viscosity of about 19 LRV. This polymer was analyzed and found to contain 0.53 mole % LISIPG.

EXAMPLE 5

The procedure of Example 1 was repeated, except that the injection rate of LISIPG was adjusted to give 2.0 mole % of LISIPG in polymer, and a finisher pressure of 13–14 mm Hg was used to obtain a polymer with a relative viscosity of about 17 LRV. This polymer was analyzed and found to contain 2.02 mole % LISIPG.

EXAMPLE 6

The procedure of Example 1 was repeated, except that the amounts of lithium acetate buffer were changed. (The points of addition of the lithium acetate can include both addition with the catalyzed glycol stream at line 11 into vessel 1, as well as injection into the monomer line with the LISIPG solution at point 23). Lithium acetate functions as a buffer to control the amount of ether formation as a side reaction in the polymerization process, mainly into diethylene glycol (DEG). Increased levels of lithium in the polymer reduced the amount of DEG, as shown in Table 6.

TABLE 6

| (1.4 MOLE % LISIPG IN POLYMER) | |
|---|---|
| Li Level in Polymer (As ppm Li) | Wt % DEG In Polymer |
| 44 | 5–6 |
| 63 | 5–6 |
| 88 | 3–4 |
| 132 | 1.5–2.0 |
| 170 | 0.8–1.5 |

Increased levels of lithium acetate have caused undesirable color formation in the polymer. A preferred level of lithium acetate has been approximately 125 ppm Li in polymer, which has given an acceptable level (2–3 wt %) of DEG in the polymer.

EXAMPLE 7

The procedure of Example 1 was repeated, except that sodium acetate was used as buffer, and was added in the catalyzed glycol at a molar ratio of 4.4 to 1, sodium acetate to manganese acetate. The polymer formed by this Example was analyzed and found to contain 2.72 wt % DEG with excellent color compared to polymers made with lithium acetate. Polymers in this Example showed an increased pack pressure in spinning. A polymer with an LRV of about 16.9 was produced at a finisher pressure of approximately 4.5 mm Hg.

Some of this polymer was spun into partially oriented yarn using essentially the same procedure as in Example 1.

The yarn was collected at approximately 3145 yards per minute windup speed and the yarn properties are shown in Table 7A.

TABLE 7A

| | |
|---|---|
| Copol, Mol % | 1.39 |
| DEG, Wt % | 2.73 |
| LRV | 16.9 |
| Spin Speed, ypm (mpm) | 3163 (2842) |
| Windup Speed, ypm (mpm) | 3145 (2876) |
| Denier | 245 |
| Ten, gpd | 2.0 |
| $E_B$, % | 143 |
| Mod, gpd | 22.9 |
| DHS, % | 65 |
| BOS, % | 60 |
| DT, g | 91.9 |
| Draw-Textured Denier | 156 |
| Draw Ratio | 1.59 |
| Drawn Tenacity | 3.0 |
| Drawn $E_B$, % | 3.1 |

Some of the polymer was also spun essentially similarly, but to provide 34 filaments with a total denier of approximately 75 and at differing speeds to show how a direct-use low shrinkage yarn can be obtained from LISIPG copolymer (corresponding to such filaments of homopolymer 2G-T as disclosed by Knox in U.S. Pat. No. 4,156,071). These yarns were also spun using conventional S-wrap technology (using a feed roll, a letdown roll and a windup with no intermediate draw step between these rolls). The yarn properties over a range of spin (windup) speeds are shown in Table 7B. As may be seen from these results, to make the desired low shrinkage levels for a direct-use yarn from LISIPG polymer according to the invention, it was preferred to use a windup speed of approximately 5000 yards (4572 meters) per minute.

COMPARISON TABLE 7C

| | | | | | | | | | | | |
|---|---|---|---|---|---|---|---|---|---|---|---|
| | | | (1.4 Mole % Na Salt Fibers) | | | | | | | | |
| ITEM | MOLE % COPOLY | LRV | WIND SPEED | SPIN SPEED | DEN | TEN | $E_B$ | MOD | DHS | BOS | DT |
| A | 1.46 | 16.1 | 4200 | 3988 | 75.1 | 2.03 | 112.9 | 30.2 | 42.2 | 40.9 | 37.8 |
| B | 1.46 | 16.1 | 4200 | 4188 | 74.9 | 2.06 | 106.1 | 31.3 | 33.7 | 34.8 | 43.4 |
| C | 1.46 | 16.1 | 4600 | 4588 | 74.8 | 2.32 | 98.3 | 35.9 | 23.5 | 25.1 | 55.8 |
| D | 1.46 | 16.1 | 5000 | 4990 | 75.7 | 2.27 | 88.9 | 39.4 | 17.0 | 17.9 | 66.1 |

By way of contrast, we have provided in COMPARISON TABLE 7C data concerning yarns spun from polymer containing 1.4 mole % sodium salt and made using conventional polyester polymerization catalysts and technology. These show that we could not use such conventional sodium salt polymer to make a similar low shrinkage, direct-use yarn at any of the spinning speeds tested.

When attempts have been made to spin such direct use (low shrinkage) yarns using standard commercial cationically-dyeable compositions of 2 mole % sodium salt, the filament bundles have been too weak to allow spinning of a continuous threadline.

Thus, according to the invention, we have provided, for the first time, crystalline spin-oriented filaments of basic-dyeable ethylene copolyester, namely containing about 0.5 to about 5 mole %, preferably about 1 to about 2.5 mole %, of the lithium salt of a glycollate of 5-sulfo-isophthalic acid, whose boil-off shrinkage (BOS) and dry-heat shrinkage (DHS, measured at 160° C.) are each not more than about 15 %, preferably not more than 12%, and especially not more than 10%, and whose DHS is not more than about 2% greater than the BOS. These new basic-dyeable lithium salt copolyester filaments may be used directly (as described for 2G-T homopolymer filament yarns by Knox in U.S. Pat. No. 4,156,071) or as warp-drawing feed yarns and thereafter as drawn yarns (as described for 2G-T homopolymer by Knox et al. in U.S. Pat. Nos. 5,066,477, and in 5,229,060, 5,244,616, 5,261,472, 5,145,623, 5,223,197 and 5,223,198).

TABLE 7B

| | | | | | | | | | | | |
|---|---|---|---|---|---|---|---|---|---|---|---|
| | | | (1.4 Mol % LISIPG FIBERS) | | | | | | | | |
| ITEM | MOLE % COPOLY | LRV | WIND SPEED | SPIN SPEED | DEN | TEN | $E_B$ | MOD | DHS | BOS | DT |
| A | 1.38 | 17.6 | 4000 | 3988 | 75.4 | 2.23 | 104.4 | 32.5 | 33.4 | 30.7 | 44.0 |
| B | 1.38 | 17.5 | 4200 | 4188 | 75.5 | 2.33 | 106.3 | 34.3 | 22.0 | 21.1 | 50.3 |
| C | 1.38 | 17.9 | 4600 | 4588 | 74.6 | 2.37 | 96.8 | 38.5 | 14.2 | 15.0 | 63.0 |
| D | 1.39 | 18.5 | 5000 | 4990 | 75.3 | 2.43 | 91.6 | 41.0 | 9.2 | 9.7 | 71.6 |

Some LISIPG polymer made essentially as described in Example 7 (but of 18.5 LRV with approximately 3.7 wt % DEG, and which showed an increased pack pressure in spinning) was also spun and drawn to give a direct use filament yarn as follows. A spinneret was held at such temperature as required to obtain a polymer temperature of 294° C. The filaments were quenched using radial flow of air at about 22° C. (18° C. wet bulb temperature). A spin finish was applied and the filaments were wrapped on a feed roll moving with a surface speed of 1000 yards (914 meters) per minute. The yarn was passed through a steam jet at 225° F. (107° C.) where the yarn was drawn and passed on to draw rolls which were contained in a hot chest and heated to 115° C., and were rotating with a surface speed of 2791 yards (2552 meters) per minute. A finish was applied to the yarn, the yarn filaments were interlaced and then wound on a tube at about 2757 yards (2521 meters) per minute. Yarn data are shown in Table 7D.

By way of contrast, a 15.9 LRV polymer made with 1.4 mole % NASIPG and containing 3.2 wt % DEG was spun and drawn using the same process conditions, and its data are also shown in Table 7D, as are those for a commercially-available cationically dyeable fiber made using conventional polymer technology and containing 2 mole % of sodium salt as a comparative example. These results show that yarns made with LISIPG have superior tenacity versus yarns made with sodium salts.

TABLE 7D

| PROPERTY | 1.4 MOLE % LISIPG | 1.4 MOLE % NASIPG | 2.0 MOLE % Na Salt |
|---|---|---|---|
| LRV | 18.5 | 15.9 | 15.3 |
| DEG, Wt % | 3.7 | 3.2 | ~2.5 |
| Spin Speed | 1000 | 1000 | 1607 |
| Draw Speed | 2791 | 2791 | |
| Windup Speed, ypm | 2757 | 2757 | 3150 |
| Denier | 78 | 76 | 70 |
| Ten, gpd | 3.3 | 3.0 | 2.7 |
| $E_B$, % | 34 | 37 | 37 |
| Mod | 71.5 | 64.5 | 59.5 |
| DHS, % | 17 | 16 | 9 |
| BOS, % | 14 | 13 | 8 |

Thus, according to the invention, we have provided novel drawn basic-dyeable yarns that have superior properties, better than those hitherto available commercially, namely yarns of filaments of lithium salt polymer, containing about 0.5 to about 5 mole %, preferably about 1 to about 2.5 mole %, of lithium salt of a glycollate of 5-sulfo-isophthalic acid, and of tenacity about 2 to about 4.5 g/dtex and of elongation-to-break ($E_B$) about 15 to about 50%.

EXAMPLE 8

Polymer was prepared and melt spun into filaments from terephthalic acid (TPA), and bis(2-hydroxy ethyl) lithium 5-sulfoiso-phthalate (LISIPG) and ethylene glycol (2G) with the resulting fibers also containing some DEG that was generated by reaction. 2G and TPA were fed into a first reaction vessel 1 (an esterification reactor) in a mole ratio of approximately 1.1:1.0 2G:T. The temperature was increased to about 280° C. at atmospheric pressure and PET oligomer (HPG) was formed with removal of water and excess ethylene glycol, and passed to a second reaction vessel 2 in a molten stream (HPG) in line 14.

No manganese acetate catalyst was added in this direct esterification process. No polymerization catalyst was added, so this is referred to herein as "catalyst-free" polymerization; some antimony is, however, generally found as a contaminant in the $TiO_2$ delusterant, so any such will be present and amount to 10–30 ppm Sb in the final polymer (containing $TiO_2$). Phosphoric acid was added to obtain approximately 30 ppm P in polymer.

$TiO_2$ delusterant was added at injection point 2.22 to the molten oligomer (HPG) to give approximately 0.2–0.3 wt % $TiO_2$ in polymer. No additional titration glycol was added. A solution of approximately 20 wt % of LISIPG and lithium acetate was added at injection point 23. The LISIPG stream injection rate was adjusted to give 1.4 mole % LISIPG in polymer. Lithium acetate was injected at injection point 21 as well as added with the LISIPG at 23, to achieve approximately 125 ppm Li in the polymer. The time taken for the molten HPG to pass from injection point 23 to the second reaction vessel 2 was only about 30 seconds. Polymerization conditions used for this process are shown in Table 8A. The polymer obtained was analyzed and found to contain 1.4 mole % LISIPG and approximately 3% by weight of DEG. The polymer had a relative viscosity of about 17–18 LRV.

TABLE 8A

| CONDITIONS | |
|---|---|
| Oligomer Line Temperature, deg. C. | 270 |
| Vessel 2 - | |
| Temperature, deg. C. | 260 |
| Pressure, mm Hg | 120 |
| Vessel 3 - | |
| Temperature, deg. C. | 275 |
| Pressure, mm Hg | 45 |
| Vessel 4 - | |
| Temperature, deg. C. | 280 |
| Pressure, mm Hg | ~3 |
| Polymer Properties - | |
| LRV | 17–18 |
| DEG, Wt % | ~3 |

The resulting polymer was spun using conventional polyester staple melt-spinning technology, essentially as described for Example 1 for Table 1K, except that the spinneret was maintained at approximately 285° C., and a single end of approximately 2800 denier containing 900 filaments was collected at 1500 yards (1372 meters) per minute, and a single end of approximately 3200 denier was collected at 1800 yards (1646 meters) per minute. Multiple ends were combined separately to form tows which were drawn using conventional staple 2-stage draw/anneal/crimping processes to provide crimped fibers with deniers from 1.4 to 1.7 dpf. Data for the drawn fibers are shown in Tables 8B and 8C, respectively.

TABLE 8B

[1500 YPM SPINNING SPEED]

| ITEM | DRAW RATIO | ANNEALING CONDITION | DPF | TEN | $E_B$ | % DH | CPI |
|---|---|---|---|---|---|---|---|
| Steam Annealed | | | | | | | |
| A | 2.28 | 170 psi | 1.70 | 3.60 | 36.5 | 10.3 | 9.1 |
| B | 2.39 | 170 psi | 1.62 | 3.86 | 31.0 | 10.2 | 9.6 |
| C | 2.47 | 170 psi | 1.57 | 4.23 | 15.6 | 10.9 | 11.5 |
| E | 2.47 | 160 psi | 1.56 | 3.93 | 19.8 | 8.7 | 9.9 |
| F | 2.47 | 150 psi | 1.57 | 4.26 | 17.0 | 7.9 | 8.3 |
| G | 2.47 | 180 psi | 1.58 | 4.16 | 19.3 | 9.3 | 11.5 |
| Roll Annealed | | | | | | | |
| H | 2.50 | 170° C. | 1.51 | 4.48 | 18.1 | 11.9 | 9.3 |
| I | 2.51 | 160° C. | 1.54 | 4.25 | 18.8 | 11.3 | 9.1 |
| J | 2.50 | 180° C. | 1.50 | 4.42 | 16.7 | 8.9 | 9.5 |

TABLE 8C

[1800 YPM SPINNING SPEED]

| ITEM | DRAW RATIO | ANNEALING CONDITION | DPF | TEN | $E_B$ | % DH | CPI |
|---|---|---|---|---|---|---|---|
| Steam Annealed | | | | | | | |
| A | 2.34 | 170 psi | 1.50 | 4.20 | 26.7 | 5.4 | 9.6 |
| B | 2.23 | 170 psi | 1.57 | 3.82 | 21.7 | 5.5 | 9.7 |
| C | 2.46 | 170 psi | 1.41 | 4.51 | 15.3 | 5.0 | 9.4 |
| E | 2.41 | 160 psi | 1.43 | 4.71 | 22.1 | 7.1 | 9.3 |
| F | 2.46 | 150 psi | 1.42 | 4.60 | 16.6 | 7.8 | 8.2 |
| G | 2.46 | 180 psi | 1.47 | 4.12 | 16.7 | 5.5 | 9.7 |
| Roll Annealed | | | | | | | |
| H | 2.49 | 170° C. | 1.37 | 4.82 | 18.6 | 9.6 | 8.8 |
| I | 2.49 | 160° C. | 1.35 | 5.08 | 12.5 | 11.2 | 8.2 |
| J | 2.49 | 180° C. | 1.34 | 4.37 | 13.9 | 9.5 | — |

For comparison, 2G-T/SSI filaments made using TPA-based polymer and drawn and steam-annealed under similar conditions are shown in Table 8D.

TABLE 8D

2G-T/SSI

| ITEM | DRAW RATIO | ANNEAL PRESSURE | DPF | TEN | $E_B$ |
|---|---|---|---|---|---|
| [1500 YPM SPINNING SPEED] | | | | | |
| CC (15) | 2.70 | 170 | 1.42 | 3.8 | 15 |
| CE (15) | 2.75 | 160 | 1.47 | 3.6 | 21 |
| CF (15) | 2.75 | 150 | 1.48 | 3.9 | 15 |
| [1800 YPM SPINNING SPEED] | | | | | |
| CC (18) | 2.60 | 170 | 1.24 | 4.3 | 13 |
| CE (18) | 2.50 | 160 | 1.27 | 4.2 | 14 |
| CF (18) | 2.60 | 150 | 1.27 | 4.4 | 16 |

These results show that the T/LISIP filaments of the invention have significantly higher tenacity, even though the 2G-T/S SI control filaments were drawn to a higher machine draw ratio.

Polymer was prepared by essentially the same procedure except that the relative viscosity was ~18 LRV and, by analysis, was found to contain about 98.5/1.5 mole % of T/LISIP and glycol-based units of about 97.5/2.5 wt. % 2G/DEG. The polymer was spun using conventional polyester staple melt spinning technology by extruding filaments through orifices with a scalloped-oval cross section. The spinneret was maintained at a temperature required to give a polymer temperature of about 300° C. The filaments were quenched with air at about 70° F. and collected into bundles at about 1500 yards per minute as a single end (with a spin finish being applied) of approximately 3600 denier containing 1054 filaments. A tow was formed by combining 34 ends to give a total of approximately 35836 filaments and a total denier of approximately 123,000 for processing in a staple-type single stagle draw/relaxed process. Drawing conditions and resulting fiber properties are shown in Table 8E.

TABLE 8E

| ITEM | DRAW RATIO | RE-LAXER TEMP °C. | DPF | TEN GPD | $E_B$ % | CRIMP INCH | DHS % |
|---|---|---|---|---|---|---|---|
| A | 2.37 | 125 | 1.63 | 3.6 | 43 | 10.1 | 6 |
| B | 2.46 | 125 | 1.58 | 3.9 | 36 | 11.4 | 6 |
| C | 2.57 | 125 | 1.54 | 3.9 | 32 | 10.8 | 6 |
| D | 2.75 | 125 | 1.44 | 4.5 | 30 | 9.5 | 8 |

In contrast, a 1.4 dpf fiber made from 2 mole % 2G-T/SSI using a similar single stage draw/relax process had a tenacity of about 3.9 g/denier with an elongation ($E_B$) of about 21%. The T/LISIP fiber showed superior tenacity compared to the 2G-T/SSI fiber even though the conventional 2G-T/SSI fiber was drawn to a greater extent (lower elongation).

Such polymer was also spun into partially oriented filaments essentially as described in Example 1. Properties of the yarn are shown in Table 8F.

TABLE 8F

| | |
|---|---|
| Copol, Mol % | 1.40 |
| DEG, Wt % | 2.3 |
| LRV | 18 |
| Spin Speed, ypm | 3274 |
| Denier | 247 |
| Ten, gpd | 2.0 |
| $E_B$, % | 148 |
| DHS, % | 64 |
| Draw Tension, g | 87 |

Polymer was prepared similarly, using TPA as in Example 8, except that the rate of addition of the LISIPG was varied to provide different levels of the comonomer in the resulting polymer. These polymers were spun into 34 filament partially oriented yarns for texturing. The yarn properties are shown in Table 8G.

TABLE 8G

| | | |
|---|---|---|
| Copol, mole % | 1.8 | 3.8 |
| DEG, wt % | 2.95 | 4.5 |
| LRV | 18.5 | 18.8 |
| Spin Speed, ypm | 3129 | 5000 |
| Denier | 295 | 253 |
| Ten, gpd | 1.9 | 1.6 |
| $E_B$, % | 145 | 90 |
| DHS, % | 63 | 50 |
| DT, g | 88 | 189 |

Somewhat similar polymer (except that it contained 0.3–0.5 wt % $TiO_2$ and 3–4% by weight of DEG, and was of LRV 18–19, and made with a pressure in Vessel 4 of about 7 mm Hg) was spun and drawn in a coupled draw process to produce a fully drawn direct use filament yarn. The polymer was extruded from the spinneret at a temperature of approximately 285° C. and was quenched using radial air flow at a temperature of about 21° C. A spin-finish was applied and the filaments were wrapped around a feed roll with a surface speed of 949 ypm, were passed through a steam draw jet at 225° F. where the yarn was drawn, and were passed onto draw rolls which were contained in a hot chest, heated to 115° C., and which were rotating with a speed of 2801 ypm. A finish was applied to the yarn, the filaments were interlaced and then wound on a tube at about 2753 ypm. The yarn properties are shown in Table 8H.

TABLE 8H

| | |
|---|---|
| Copol, Mol % | 1.4 |
| DEG, Wt % | 3.8 |
| LRV | 19 |
| Feed Roll Speed, ypm | 949 |
| Draw Roll Speed, ypm | 2801 |
| Windup Speed, ypm | 2753 |
| Denier | 71 |
| Ten, gpd | 3.7 |
| $E_B$, % | 29 |
| BOS, % | 10 |
| DHS, % | 14 |

Antimony oxide (80 ppm) has successfully been used (without $TiO_2$ delusterant) for making lithium salt (1.4 mole %, 2.6 wt % DEG) polymer of 18.5 LRV from TPA and such polymer was spun at 3225 ypm (2950 mpm) to give POY of 247 denier, and of tenacity 2.1 gpd, 148% $E_B$, 64% DHS, and 90 g draw tension. Similarly tetrapropyltitanate has been used as a catalyst (without $TiO_2$) to give similar polymer (1.4 mole % lithium salt, 2.6 wt. % DEG, 17.7 LRV) which was spun essentially similarly (3275 ypm) to give POY yarn of 245 denier, tenacity 2.1 gpd, 152% $E_B$, 64% DHS and 92 g draw tension.

EXAMPLE 9

A 40-lb horizontal autoclave with an agitator, vacuum jets, and a monomer distillation still, located above the clave portion of the autoclave, was used to prepare batches of polyester copolymers containing varying amounts of LISIPG or of NASIPG, as shown in the following Table 10A, some with added antimony trioxide, and others without specifically adding antimony trioxide (but some would be present in the $TiO_2$). The monomer still was charged with 39.2 lb of dimethyl terephthalate (DMT) and 27.6 lb of ethylene glycol (2G). Sufficient manganese acetate exchange catalyst was added to obtain approximately 110 ppm Mn in the polymer. In addition, 45 grams of lithium acetate was also added to the still as a buffer to retard the formation of DEG. The temperature of the still was gradually raised to 220° C. and approximately 6200 grams of methanol distillate were recovered. The molten monomer was then dropped from the monomer still to the clave portion of the autoclave. Then an amount of phosphoric acid solution sufficient to obtain about 94 ppm phosphorus (in the polymer) was added to the clave. Then an appropriate amount of LISIPG or NASIPG was added (as a 20% by weight solution in 2G) to the clave along with about 250 ml of a 20 wt % slurry of $TiO_2$ (also in 2G); for instance, 725 grams of LISIPG was added in Item K to give 1.4 mole % of LISIPG at an LRV of 23.5. The ingredients were agitated and well mixed and polymerized by increasing the temperature to 275° C. and lowering the clave pressure to less than 10 mm HE. The polymer was extruded through a ribbon dye, quenched, and cut. Recovered polymer was analyzed and the data are all shown in Table 9A as Items B, D, F, H, J and L, along with data for Items A, C, E, G, I and K prepared essentially similarly except that antimony trioxide was added as polymerization catalyst in sufficient amount to obtain about 220 ppm Sb in the polymer.

TABLE 9A

| ITEM | LRV | MOLE % NASIPG | MOLE % LISIPG | $TiO_2$ | DEG | 8b | MN | P |
|---|---|---|---|---|---|---|---|---|
| A | 14.13 | 2.0 | | 0.319 | 1.13 | 224 | 102 | 83 |
| B | 14.30 | 2.0 | | 0.346 | 0.66 | 20 | 105 | 80 |
| C | 18.80 | | 2.6 | 0.442 | 1.84 | 221 | 102 | 93 |

TABLE 9A-continued

| ITEM | LRV | MOLE % NASIPG | MOLE % LISIPG | TiO$_2$ | DEG | 8b | MN | P |
|---|---|---|---|---|---|---|---|---|
| D | 18.80 | | 2.5 | 0.377 | 1.75 | 18 | 108 | 93 |
| E | 16.10 | 1.4 | | 0.354 | 0.83 | 214 | 102 | 84 |
| F | 17.40 | 1.4 | | 0.339 | 0.90 | 18 | 109 | 75 |
| G | 24.10 | | 1.6 | 0.398 | 1.55 | 206 | 102 | 87 |
| H | 19.95 | | 1.8 | 0.376 | 1.51 | 15 | 110 | 86 |
| I | 20.15 | | 2.0 | 0.323 | 1.59 | 219 | 105 | 96 |
| J | 17.50 | | 2.0 | 0.329 | 1.30 | 17 | 107 | 94 |
| K | 21.30 | | 1.4 | 0.313 | 1.29 | 220 | 108 | 94 |
| L | 23.50 | | 1.4 | 0.327 | 1.23 | 18 | 110 | 94 |

These data show the antimony trioxide polymerization catalyst was not required for making the LISIPG-containing polymer.

Polymers were spun into 34 filament partially oriented filament yarns essentially as described in Example 1. Properties of the yarns are shown in Table 9B. Fibers prepared using LISIPG show superior tenacity to those prepared using NASIPG, with and without added antimony trioxide polymerization catalyst.

TABLE 9B

POY YARN PROPERTIES

| ITEM | MOLE % LISIPG | MOLE % NASIPG | Sb ppm | Denier | Ten | E$_B$ | DHS | DT |
|---|---|---|---|---|---|---|---|---|
| A | — | 2.0 | 224 | 246.8 | 1.69 | 140.4 | 58.1 | 93.6 |
| B | — | 2.0 | 20 | 247 | 1.69 | 140.5 | 55.4 | 100.1 |
| C | 2.6 | — | 221 | 246.8 | 1.75 | 122.8 | 64.1 | 99.1 |
| D | 2.5 | — | 18 | 247.2 | 1.78 | 124.4 | 62.3 | 104.2 |
| E | — | 1.4 | 214 | 244.2 | 1.92 | 140.3 | 58.3 | 94.6 |
| F | — | 1.4 | 18 | 247.2 | 1.99 | 140.3 | 52.4 | 110 |
| G | 1.6 | — | 206 | WOULD NOT SPIN (EXCESSIVE PRESSURE FROM HIGH LRV) | | | | |
| H | 1.8 | — | 15 | 245.5 | 2.03 | 129.8 | 58.6 | 111.2 |
| I | 2.0 | — | 219 | 243.4 | 1.93 | 131.5 | 63.6 | 96.5 |
| J | 2.0 | — | 17 | 245.9 | 1.97 | 129.3 | 59.3 | 107.2 |
| K | 1.4 | — | 220 | 244.3 | 2.14 | 126.1 | 52.8 | 124.5 |
| L | 1.9 | — | 18 | 244.1 | 2.30 | 133.6 | 52.1 | 127.1 |

As will have been noted from the comparative results when spinning filaments noted above, use of the invention has provided advantages that have not been attainable hitherto using prior art basic-dyeable copolyester that has been commercially available. Thus, novel basic-dyeable polyester filaments and yarns are provided according to the invention. These include draw-texturing feed yarns, comprising partially oriented yarns, especially amorphous spin-oriented yarns of the basic-dyeable copolyester according to the invention but, otherwise, essentially as described in the art search as Petrille U.S. Pat. No. 3,771,307 or Piazza and Reese U.S. Pat. No. 3,772,872. They also include crystalline spin-oriented yarns, as described, for example, by Knox in U.S. Pat. No. 4,156,071, or by Frankfort and Knox in U.S. Pat. Nos. 4,136,882 and 4,195,051, for homopolymer yarns in those patents, but, of course, using copolyester polymer according to the present invention. They also include filaments of low dpf, especially such as we spun and/or draw to subdeniers, as described in U.S. Pat. Nos. 5,250,245, 5,288,553, by way of example. Each of the terms filaments and fibers are used herein broadly, as context allows, and are not intended to be mutually exclusive. The novel basic-dyeable lithium salt copolyester polymer may be used to make cut fiber (often referred to as staple) and yarns and other products therefrom.

Various advantages obtained by the present invention have been indicated in the Examples and elsewhere hereinabove. Avoiding incorporating the amounts of antimony heretofore used commercially (in the form of antimony trioxide, as polymerization catalyst) is expected to be a very significant advantage in commercial operations, for instance in reducing wipe cycles, and was entirely unexpected by us, but the present invention is not limited to avoiding or limiting the use of antimony as a catalyst. The unexpected catalytic activity also seems to explain, in retrospect, many practical problems experienced hitherto in making basic-dyeable copolyester polymer commercially from the sodium salt of 5-sulibisophthalic acid. We have obtained very significant advantages from using a lithium salt (of 5-sulfoisophthalic acid) instead of using the sodium salt which has been used exclusively to make basic-dyeable copolyester polymer in commercial practice. The art did also disclose in the 1970's that lithium aromatic sulfonates imparted deeper dyeability to linear synthetic polyester than other alkali metal aromatic sulfonates, e.g., by Davis et al., Juelke, and Juelke et al., in U.S. Pat. Nos. 3,706,712 and 4,042,618, 3,72,919, and 3,816,520. To summarize, the present invention is based on unexpected findings in relation to well-established commercial practices and prejudices, the full consequences of which are likely to take a long time and considerable commercial experience to evaluate properly.

We claim:

1. Oriented filaments of basic-dyeable ethylene terephthalate copolyester that contains 0.5 to 5 mole percent of lithium salt of a glycollate of 5-sulfo-isophthalic acid and of fine titre not more than about 2 dtex per filament.

2. Oriented filaments of basic-dyeable ethylene terephthalate copolyester that contains 0.5 to 5 mole percent of lithium salt of a glycollate of 5-sulfo-isophthalic acid, and being spun-oriented filaments.

3. Oriented filaments according to claim 2 that are crystalline and in the form of a yarn whose boil-off shrinkage (BOS) and dry-heat shrinkage measured at 160° C. (DHS) are not more than about 15%, and whose DHS is not more than about 2% greater than the BOS.

4. Oriented filaments according to claim 2 that are partially oriented.

5. Oriented filaments according to claim 4 that are in the form of a draw-texturing feed yarn.

6. Oriented filaments according to claim 4 that are in the form of a warp-draw feed yarn.

7. Oriented filaments of basic-dyeable ethylene terephthalate copolyester that contains 0.5 to 5 mole percent of lithium salt of a glycollate of 5-sulfo-isophthalic acid, in the form of a yarn of tenacity about 2 to about 5 g/denier and of elongation-to-break ($E_B$) about 15 to about 50%.

8. Oriented filaments of basic-dyeable ethylene terephthalate copolyester that contains 0.5 to 5 mole percent of lithium salt of a glycollate of 5-sulfo-isophthalic acid, in the form of a tow without interlace and of tenacity about 2 to about 5 g/denier and of elongation-to-break ($E_B$) about 15 to about 50%.

9. Oriented filaments of basic-dyeable ethylene terephthalate copolyester that contains 0.5 to 5 mole percent of lithium salt of a glycollate of 5-sulfo-isophthalic acid, in the form of staple fiber of tenacity about 2 to about 5 g/denier and of elongation-to-break ($E_B$) about 15 to about 50%, and of cut length about 1 to about 20 cm.

* * * * *